US011195437B2

(12) United States Patent
Zheng

(10) Patent No.: US 11,195,437 B2
(45) Date of Patent: Dec. 7, 2021

(54) FLEXIBLE DISPLAY DEVICE

(71) Applicant: Wuhan China Star Optoelectronics Technology Co., Ltd., Wuhan (CN)

(72) Inventor: Yingbo Zheng, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 149 days.

(21) Appl. No.: 16/625,724

(22) PCT Filed: Aug. 13, 2019

(86) PCT No.: PCT/CN2019/100287
§ 371 (c)(1),
(2) Date: Dec. 22, 2019

(87) PCT Pub. No.: WO2020/258457
PCT Pub. Date: Dec. 30, 2020

(65) Prior Publication Data
US 2021/0280094 A1 Sep. 9, 2021

(30) Foreign Application Priority Data
Jun. 25, 2019 (CN) ........................ 201910553272.7

(51) Int. Cl.
*G06F 3/041* (2006.01)
*G09F 9/30* (2006.01)

(52) U.S. Cl.
CPC .................................... *G09F 9/301* (2013.01)

(58) Field of Classification Search
CPC ... G09F 9/301; G02F 1/13452; H01L 27/124; H01L 27/3276; H05K 2201/10128
See application file for complete search history.

(56) References Cited

U.S. PATENT DOCUMENTS

| | | | | |
|---|---|---|---|---|
| 2014/0085585 | A1* | 3/2014 | Sung | G02F 1/13458 349/143 |
| 2016/0093685 | A1* | 3/2016 | Kwon | H01L 51/0097 257/40 |
| 2018/0039364 | A1* | 2/2018 | Pan | H01L 24/06 |
| 2019/0067218 | A1* | 2/2019 | Lin | H01L 27/1248 |
| 2019/0244974 | A1 | 8/2019 | Chen | |
| 2020/0033972 | A1* | 1/2020 | Huang | G02F 1/13338 |

(Continued)

FOREIGN PATENT DOCUMENTS

| | | |
|---|---|---|
| CN | 106647070 | 5/2017 |
| CN | 109116643 | 1/2019 |
| CN | 109212851 | 1/2019 |

(Continued)

*Primary Examiner* — Joe H Cheng

(57) ABSTRACT

A flexible display device, which at least includes a plurality of bonding pins. A plurality of first bonding pins are disposed on an interlayer between a TFT array substrate and a color film substrate, and the plurality of the first bonding pins respectively extend to a first lateral surface of the TFT array substrate and a first lateral surface of the color film substrate; a plurality of second bonding pins are used for bonding with a first flexible circuit board and are partially disposed on a bottom surface of the TFT array substrate; and a plurality of third bonding pins are used for bonding with a second flexible circuit board and are partially disposed on an upper surface of the color film substrate.

16 Claims, 4 Drawing Sheets

(56) References Cited

U.S. PATENT DOCUMENTS

| | | | | |
|---|---|---|---|---|
| 2020/0081568 | A1 | 3/2020 | Xu et al. | |
| 2021/0124202 | A1* | 4/2021 | Pan | H05K 1/00 |

FOREIGN PATENT DOCUMENTS

| | | |
|---|---|---|
| CN | 109377890 | 2/2019 |
| CN | 109541834 | 3/2019 |
| CN | 108241240 | 8/2020 |
| JP | 6347946 | 6/2018 |

* cited by examiner

FLEXIBLE DISPLAY DEVICE

RELATED APPLICATIONS

This application is a National Phase of PCT Patent Application No. PCT/CN2019/100287 having International filing date of Aug. 13, 2019, which claims the benefit of priority of Chinese Patent Application No. 201910553272.7 filed on Jun. 25, 2019. The contents of the above applications are all incorporated by reference as if fully set forth herein in their entirety.

FIELD AND BACKGROUND OF THE INVENTION

The present disclosure relates to the field of display technology, and particularly relates to a flexible display device.

Currently, for thin film transistor (TFT) displays such as liquid crystal display (LCD) panels, organic light emitting diode (OLED) display panels, and micro light-emitting diode (micro-LED) display panels, to drive each pixel, it is required for the pixel to be connected to an edge of the panel through a trace in the TFT layer to form pins and a chip on flexible printed circuit (chip on FPC) for bonding, thereby realizing to transmit driving signals for each signal in the display panel. Present high-end full-screen display pursues a narrow bezel design, and the COF solution generally is adopted as a mainstream design. When the pixel resolution gradually increases, the number of pins connected to the COF is also increased, thereby requiring relative modifications in design such as setting a corresponding number of bonding pins in the bonding region of the display device. However, in the current bonding process, since the anisotropic conductive film (ACF) adhesive requires a certain bonding contact area, and alignment of automation devices have a certain tolerance, and a pad pitch in the bonding region cannot be lower than 27 μm; on the other hand, the display panel applied on the full-screen terminal has a bonding region limited to be disposed on one limited frame, for example, a full-screen mobile phone screen ranging from 5.99 inches to 6.39 inches, and its COF bonding region is located on a short side of a side of the mobile phone screen, and the maximum bonding width is less than or equal to 62 mm.

In summary, for current flexible display devices, due to the double limitation of the pad pitch cannot be less than 27 μm and the bonding region width cannot be higher than 62 mm, the number of pins accommodated in the bonding region is limited, which further affects the resolution of the flexible display device cannot be further increased.

The technical problem is that for current flexible display devices, due to the double limitation of the pad pitch cannot be less than 27 μm and the bonding region width cannot be higher than 62 mm, the number of pins accommodated in the bonding region is limited, which further affects the resolution of the flexible display device cannot be further increased.

SUMMARY OF INVENTION

The present disclosure provides a flexible display device, which is capable of doubling the number of pins that can be accommodated under a limited bonding effective region width limit to solve the technical problem of current flexible display devices, that is, due to the double limitation of the pad pitch cannot be less than 27 μm and the bonding region width cannot be higher than 62 mm, the number of pins accommodated in the bonding region is limited, which further affects the resolution of the flexible display device cannot be further increased.

In order to solve the problems mentioned above, the present disclosure provides the technical solutions as follows:

The present disclosure provides a flexible display device, which includes a backlight module, a flexible display panel, a plurality of first bonding pins, a plurality of second bonding pins, a plurality of third bonding pins, a first flexible circuit board, a second flexible circuit board, and a driving chip, and the flexible display panel further includes a thin film transistor (TFT) array substrate, and a color film substrate corresponds to the TFT array substrate.

The plurality of the first bonding pins are disposed on an interlayer between the TFT array substrate and the color film substrate, and the plurality of the first bonding pins respectively extend to a first lateral surface of the TFT array substrate and a first lateral surface of the color film substrate along a first direction D1, the plurality of the second bonding pins are used for bonding with the first flexible circuit board and are partially disposed on a bottom surface of the TFT array substrate, the plurality of the third bonding pins are used for bonding with the second flexible circuit board and are partially disposed on an upper surface of the color film substrate; the flexible display panel further includes a display area and a non-display area located on periphery of the display area, the plurality of the first bonding pins are extended to the non-display area by passing through the display area, the plurality of the second bonding pins and the plurality of the third bonding pins are both disposed on the non-display area.

In an embodiment of the flexible display device provided by the present disclosure, part of the first bonding pins located on the display area is electrically connected to a signal line disposed on the display area.

In an embodiment of the flexible display device provided by the present disclosure, the non-display area includes a non-bending region and a bending region, the second bonding pins and the third bonding pins are both disposed in the bending region.

In an embodiment of the flexible display device provided by the present disclosure, relative positions of part of the second bonding pins located on the bottom surface of the TFT array substrate and part of the third bonding pins located on the upper surface of the color film substrate are disposed in stagger.

In an embodiment of the flexible display device provided by the present disclosure, a pad pitch between part of the second bonding pins located on the bottom surface of the TFT array substrate is half to a corresponding bonding pitch, a pad pitch between part of the third bonding pins located on the upper surface of the third bonding pins is half to a corresponding bonding pitch.

In an embodiment of the flexible display device provided by the present disclosure, a pad pitch of the plurality of the second bonding pins and the plurality of the third bonding pins is greater than or equal to 27 μm.

In an embodiment of the flexible display device provided by the present disclosure, the first lateral surface of the TFT array substrate and the first lateral surface of the color film substrate are edged mirror planes, a roughness of the mirror planes ranges from 0.04 μm to 0.7 μm.

In an embodiment of the flexible display device provided by the present disclosure, an included angle between the first lateral surface of the TFT array substrate and the bottom surface of the TFT array substrate is a fillet or a 45 degree edge chamfer, an included angle between the first lateral surface of the color film substrate and the upper surface of the color film substrate is a fillet or a 45 degree edge chamfer.

In an embodiment of the flexible display device provided by the present disclosure, the driving chip is electrically connected to the first flexible circuit board and the second flexible circuit board by an anisotropic conductive film.

The present disclosure further provides a flexible display device, which includes a backlight module, a flexible display panel, a plurality of first bonding pins, a plurality of second bonding pins, a plurality of third bonding pins, a first flexible circuit board, a second flexible circuit board, and a driving chip, and the flexible display panel further includes a thin film transistor (TFT) array substrate, and a color film substrate corresponds to the TFT array substrate; the plurality of the first bonding pins are disposed on an interlayer between the TFT array substrate and the color film substrate, and the plurality of the first bonding pins respectively extend to a first lateral surface of the TFT array substrate and a first lateral surface of the color film substrate along a first direction D1, the plurality of the second bonding pins are used for bonding with the first flexible circuit board and are partially disposed on a bottom surface of the TFT array substrate, the plurality of the third bonding pins are used for bonding with the second flexible circuit board and are partially disposed on an upper surface of the color film substrate.

In an embodiment of the flexible display device provided by the present disclosure, relative positions of part of the second bonding pins located on the bottom surface of the TFT array substrate and part of the third bonding pins located on the upper surface of the color film substrate are disposed in stagger.

In an embodiment of the flexible display device provided by the present disclosure, a pad pitch between part of the second bonding pins located on the bottom surface of the TFT array substrate is half to a corresponding bonding pitch, a pad pitch between part of the third bonding pins located on the upper surface of the third bonding pins is half to a corresponding bonding pitch.

In an embodiment of the flexible display device provided by the present disclosure, a pad pitch of the plurality of the second bonding pins and the plurality of the third bonding pins is greater than or equal to 27 μm.

In an embodiment of the flexible display device provided by the present disclosure, the first lateral surface of the TFT array substrate and the first lateral surface of the color film substrate are edged mirror planes, a roughness of the mirror planes ranges from 0.04 μm to 0.7 μm.

In an embodiment of the flexible display device provided by the present disclosure, an included angle between the first lateral surface of the TFT array substrate and the bottom surface of the TFT array substrate is a fillet or a 45 degree edge chamfer, an included angle between the first lateral surface of the color film substrate and the upper surface of the color film substrate is a fillet or a 45 degree edge chamfer.

In an embodiment of the flexible display device provided by the present disclosure, the driving chip is electrically connected to the first flexible circuit board and the second flexible circuit board by an anisotropic conductive film.

The beneficial effect of the present disclosure is that the flexible display device provided by the present disclosure makes a plurality of bonding pins be respectively disposed on the front and back sides of the display panel for bonding to the flexible circuit board, so that doubling the number of pins that can be accommodated under a limited bonding effective region width limit, thereby further increasing the resolution of the flexible display device.

BRIEF DESCRIPTION OF THE SEVERAL VIEWS OF THE DRAWINGS

To more clearly illustrate embodiments or the technical solutions of the present disclosure, the accompanying figures of the present disclosure required for illustrating embodiments or the technical solutions of the present disclosure will be described in brief. Obviously, the accompanying figures described below are only part of the embodiments of the present disclosure, from which figures those skilled in the art can derive further figures without making any inventive efforts.

DETAILED DESCRIPTION OF SPECIFIC EMBODIMENTS OF THE INVENTION

The descriptions of embodiments below refer to accompanying drawings in order to illustrate certain embodiments which the present disclosure can implement. The directional terms of which the present disclosure mentions, for example, "top," "bottom," "upper," "lower," "front," "rear," "left," "right," "inside," "outside," "side," etc., are just refer to directions of the accompanying figures. Therefore, the used directional terms are for illustrating and understanding the present disclosure, but not for limiting the present disclosure. In the figures, units with similar structures are used same labels to indicate.

The present disclosure aims at addressing the technical problem of current flexible display devices, that is, due to the double limitation of the pad pitch being cannot be less than 27 μm and the bonding region width cannot be higher than 62 mm, the number of pins accommodated in the bonding region is limited, which further affects the resolution of the flexible display device cannot be further increased. The present disclosure can overcome such defects.

Figure 1:
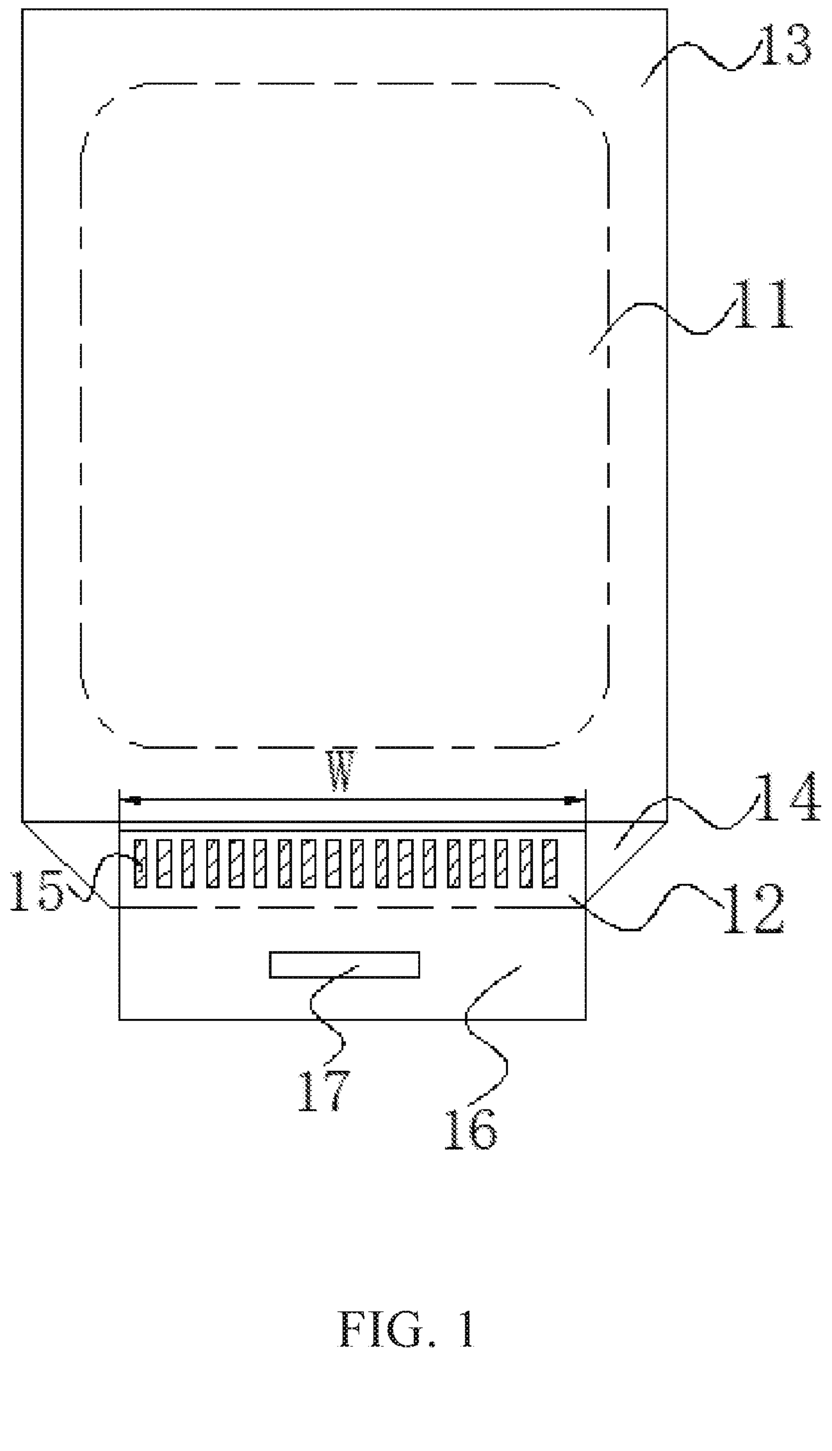
FIG. 1 is a plane structural schematic diagram of a current flexible display device.

As illustrated in FIG. 1, which is a plane structural schematic diagram of a current flexible display device. The current flexible display device includes a display region 11 and a bonding region 12 located under the display region 12. The current flexible display device further includes a thin film transistor (TFT) array substrate 14 and a color film substrate 13 corresponding to each other; a plurality of bonding pins 15 are disposed in the bonding region 12, the plurality of the bonding pins 15 are bonded with a flexible electric circuit 16; a driving chip 17 is bonded with the flexible electric circuit 16 by anisotropic conductive film (ACF) adhesive. A plurality of connection pins and the plurality of the bonding pins 15 disposed on an upper edge of the flexible electric circuit 16 are bonded correspondingly one to one to form a bonding structure to realize bonding. To ensure accuracy of bonding alignment, the minimum bonding pitch of the bonding region 12 is required to reserve to be not less than 27 μm; on the other hand, as the bonding region 12 is limited to be disposed on one limited frame, a bonding width W of the bonding region 12 is also limited to a certain extent. Therefore, it can be predicted that as the resolution of the flexible display panel (PPI) becomes higher and higher, the bonding width W of the bonding region 12 becomes wider and wider, and when the resolution reaches 2K or higher, will face with the problem of a drastic decrease in yield will arise, thereby affecting the resolution of the flexible display device cannot be further increased.

Figure 2:
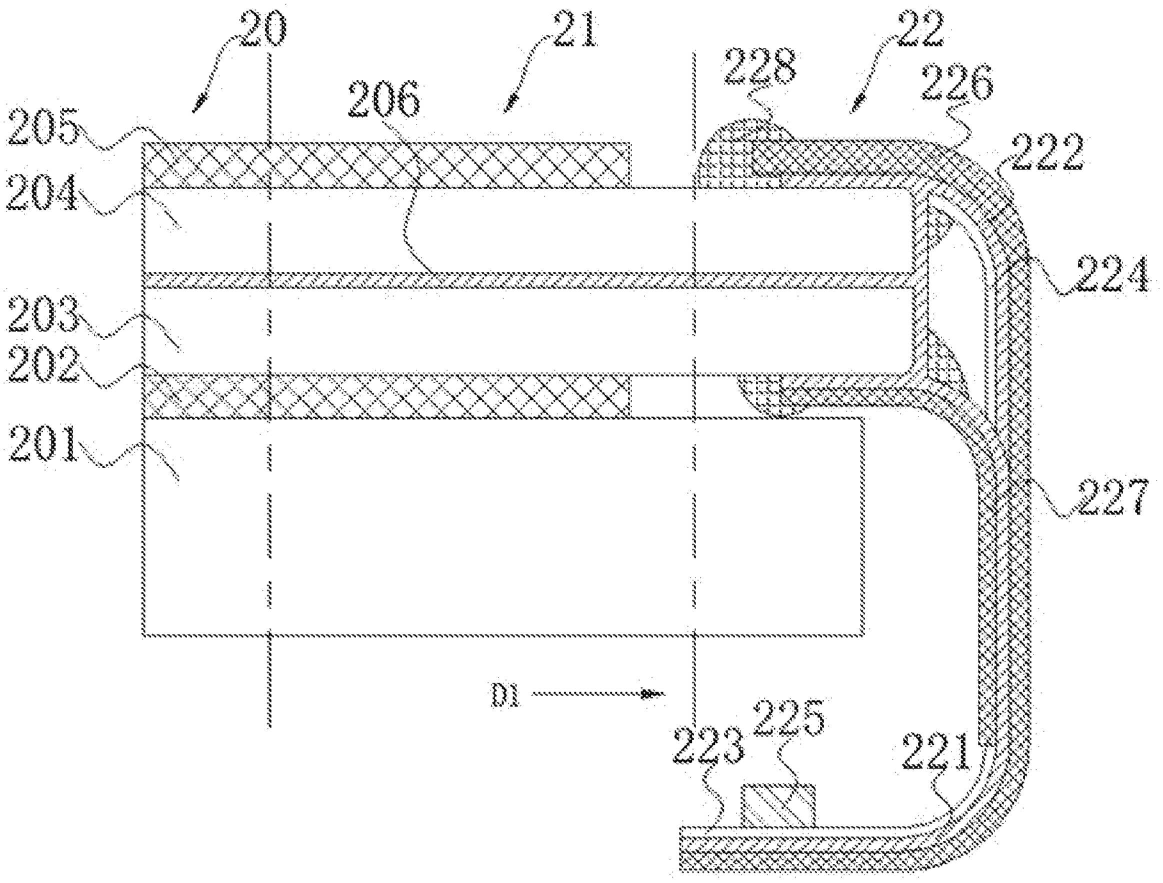
FIG. 2 is a lateral view of a flexible display device in an embodiment of the present disclosure.

As illustrated in FIG. 2, it is a lateral view of a flexible display device in an embodiment of the present disclosure. The flexible display panel further includes a display area 20 and a non-display area located on periphery of the display area, and the non-display area includes a non-bending region 21 and a bending region 22.

The flexible display panel further includes a backlight module 201, a first flexible substrate 202, a thin film transistor (TFT) array substrate 203, a color film substrate 204, and a second flexible substrate 205 which are disposed from bottom to top; the first flexible substrate 202, the TFT array substrate 203, the color film substrate 204, and the second flexible substrate 205 are constituted into a flexible display panel; a plurality of first bonding pins 206 are disposed on an interlayer between the TFT array substrate 203 and the color film substrate 204, and the plurality of the first bonding pins 206 respectively extend to a first lateral surface of the TFT array substrate 203 and a first lateral surface of the color film substrate 204 along a first direction D1; a plurality of second bonding pins 221 are used for bonding with a first flexible circuit board 223 and are partially disposed on a bottom surface of the TFT array substrate 203; a plurality of third bonding pins 222 are used for bonding with a second flexible circuit board 224 and are partially disposed on an upper surface of the color film substrate 204.

Specifically, material of the first flexible substrate 202 and the second flexible substrate 205 is polyimide (PI) film.

Specifically, the plurality of the first bonding pins 206 are extended to the non-display area by passing through the display area 20; part of the first bonding pins 206 located on the display area are electrically connected to a signal line disposed on the display area 20.

Specifically, the plurality of the second bonding pins 221 and the plurality of the third bonding pins 222 are both disposed on the bending region 22 in the non-display area.

Specifically, part of the second bonding pins 221 and the first bonding pins 206 are electrically connected to a bottom surface of the TFT array substrate 203; part of the third bonding pins 222 and the first bonding pins 206 are electrically connected to an upper surface of the color film substrate 204.

Specifically, in the bending region 22, part of the second bonding pins 221 are sandwiched between a third flexible substrate 226 and a fourth flexible substrate 227; part of the third bonding pins 222 are disposed on the third flexible substrate 226, and the third flexible substrate 226 and the fourth flexible substrate 227 are both in bent condition. Material of the third flexible substrate 226 and the fourth flexible substrate 227 is PI film.

Specifically, the first flexible circuit board 223 are bonded with the third flexible substrate 226 through part of the second bonding pins 221; the second flexible circuit board 224 are bonded with the third flexible substrate 226 through part of the third bonding pins 222.

Specifically, the driving chip 225 is electrically connected to the first flexible circuit board 223 or the second flexible circuit board 224 by an anisotropic conductive film.

Specifically, the first lateral surface of the TFT array substrate 203 and the first lateral surface of the color film substrate 204 are edged mirror planes, a roughness of the mirror planes ranges from 0.04 μm to 0.7 μm. This is because after the color film substrate 204 and the TFT array substrate 203 are edge-cut into slivers, the first lateral surface of the TFT array substrate 203 and the first lateral surface of the color film substrate 204 are made to be fine polished to configure as the edged mirror planes, and defects of the edge of the flexible display panel can be eliminated.

Specifically, an included angle between the first lateral surface of the TFT array substrate 203 and the bottom surface of the TFT array substrate 203 is a fillet or a 45-degree edge chamfer; an included angle between the first lateral surface of the color film substrate 204 and the upper surface of the color film substrate 204 is a fillet or a 45 degree edge chamfer, which has the advantage of preventing subsequent sharp edges from cutting the flexible display device.

Specifically, in the bending region 22, a bonding layer 228 is disposed on an edge of part of the second bonding pins 221 and the fourth flexible substrate 227; the bonding layer 228 is disposed on an edge of part of the second bonding pins 221 and an edge of part of the first bonding pins 206; the bonding layer 228 is disposed on an edge of part of the third bonding pins 222 and the third flexible substrate 226; the bonding layer 228 is disposed on an edge of part of the third bonding pins 222 and an edge of part of the first bonding pins 206. Material of the bonding layer 228 is curing glue or tape. Disposing the bonding layer 228 in the bending region 22 can meet the pull force requirement and isolate external chemical erosion, thereby improving overall reliability.

Figure 3A:
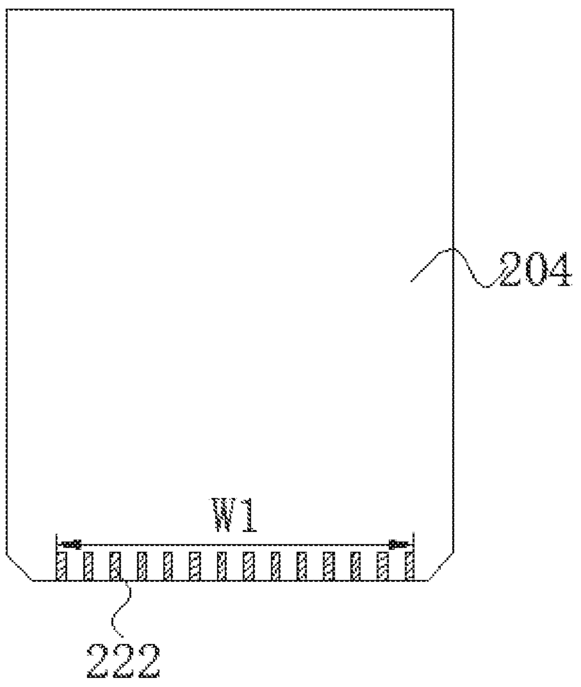
FIGS. 3*a*, 3*b*, 3*c* and to FIG. 3*d* are plane schematic diagrams of part of first bonding pins of a flexible display device in an embodiment of the present disclosure.

As illustrated in FIGS. 3*a*, 3*b*, 3*c* and 3*d*, they are plane schematic diagrams of a part of first bonding pins of a flexible display device in an embodiment of the present disclosure, as follows:

FIG. 3*a* is a plane schematic diagram of part of the third bonding pins 222 on the upper surface of the color film substrate 204, and a bonding width of part of the third bonding pins 222 on the upper surface of the color film substrate 204 is W1.

Figure 3B:
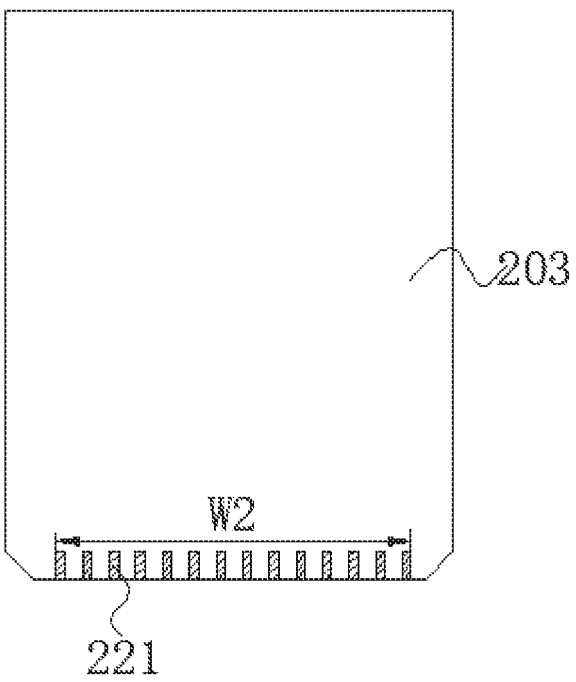

FIG. 3*b* is a plane schematic diagram of part of the second bonding pins 221 on the bottom surface of the TFT array substrate 203, and a bonding width of part of the second bonding pins 221 on the bottom surface of the TFT array substrate 203 is W2. Specifically, the bonding width W1 is equal to the bonding width W2. As the display panel applied on the full-screen terminal having a bonding region is limited to be disposed on one limited frame, for example, a full-screen mobile phone screen ranging from 5.99 inches to 6.39 inches, and its bonding region is located on a short side of a side of the mobile phone screen, and the maximum bonding width is less than or equal to 62 mm. Therefore, the bonding width W1 and the bonding width W2 are less than or equal to 62 mm.

Figure 3C:
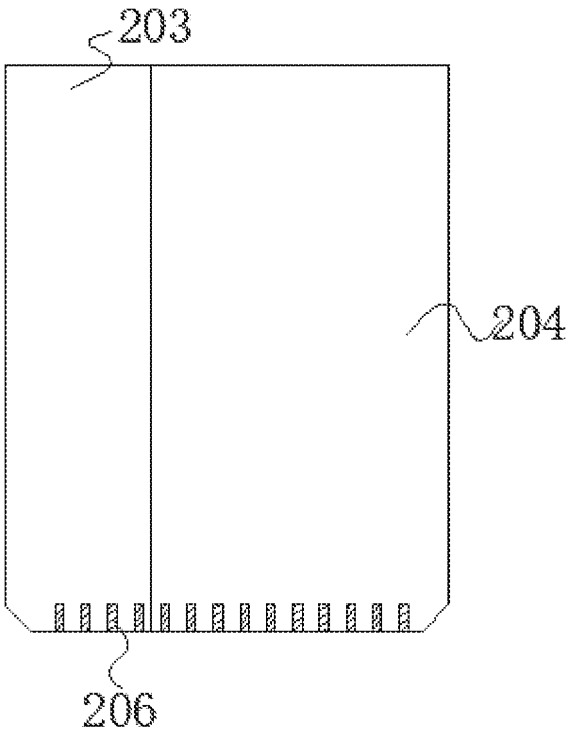

FIG. 3*c* is a plane schematic diagram of part of the first bonding pins 206 on the first lateral surface of the TFT array substrate 203 and the first lateral surface of the color film substrate 204. Part of the first bonding pins 206 is disposed in the interlayer between the TFT array substrate 203 and the color film substrate 204.

Figure 3D:
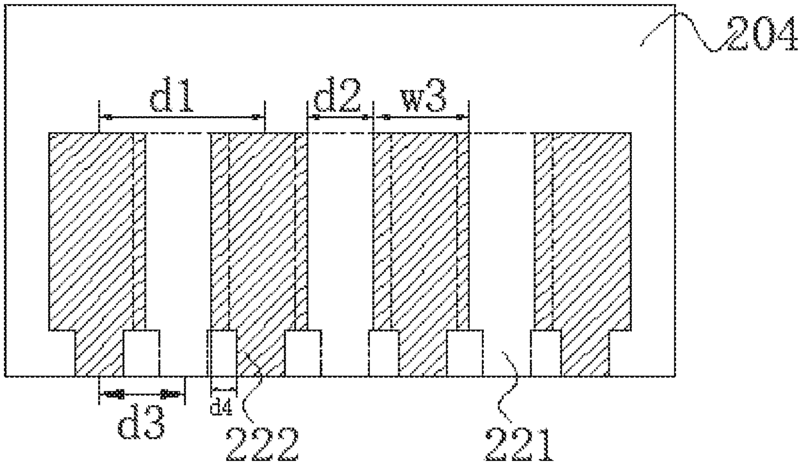

FIG. 3*d* is an enlarged schematic diagram of part of the third bonding pins 222 on the upper surface of the color film substrate 204. Relative positions of part of the second bonding pins 221 located on the bottom surface of the TFT array substrate 203 and part of the third bonding pins 222 located on the upper surface of the color film substrate 204 are disposed in stagger.

Specifically, a pad pitch d3 between part of the third bonding pins 222 located on the upper surface of the color film substrate 204 is half of a corresponding bonding pitch d1, a pad space d4 between part of the third bonding pins 222 located on the upper surface of the color film substrate 204 is less than the pad pitch d3. Because part of the third bonding pins 222 located on the upper surface of the color filter substrate 204 is located on the bonding region of the bonding process, the maximum bonding pitch d1 is 27 μm. At this time, the bonding space d2 of the two third bonding pins 222 next to each other is 13 mm, and the bonding width w3 of each of the third bonding pins 222 is 14 μm. Because the pad space d4 is in the non-bonding region, there is no need to meet requirements of the bonding process.

Correspondingly, part of the second bonding pin 221 located on the bottom surface of the TFT array substrate 203 is in the bonding region of the bonding process, a pad pitch between part of the second bonding pins 221 located on the bottom surface of the TFT array substrate 203 is half of a corresponding bonding pitch, and the maximum bonding pitch is 27 μm.

Compared with the prior art, the flexible display device provided by the present disclosure doubles the number of bonding pins that can be accommodated under the limitation of the width of the same bonding effective region, and the resolution of the flexible display device is also doubled. On the other hand, the yield of the flexible display device bonding process can be effectively improved.

The beneficial effect of the present disclosure is that the flexible display device provided by the present disclosure makes a plurality of bonding pins be respectively disposed on the front and back sides of the display panel for bonding to the flexible circuit board, so that doubling the number of pins that can be accommodated under a limited bonding effective region width limit, thereby further increasing the resolution of the flexible display device.

In summary, although the present disclosure has disclosed the preferred embodiments as above, however the above-mentioned preferred embodiments are not to limit to the present disclosure. A person skilled in the art can make any change and modification, therefore the scope of protection of the present disclosure is subject to the scope defined by the claims.

What is claimed is:

1. A flexible display device, comprising a backlight module, a flexible display panel, a plurality of first bonding pins, a plurality of second bonding pins, a plurality of third bonding pins, a first flexible circuit board, a second flexible circuit board, and a driving chip, and the flexible display panel further comprises a thin film transistor (TFT) array substrate, and a color film substrate corresponds to the TFT array substrate;

wherein the plurality of the first bonding pins are disposed on an interlayer between the TFT array substrate and the color film substrate, and the plurality of the first bonding pins respectively extend to a first lateral surface of the TFT array substrate and a first lateral surface of the color film substrate along a first direction, the plurality of the second bonding pins are used for bonding with the first flexible circuit board and are partially disposed on a bottom surface of the TFT array substrate, the plurality of the third bonding pins are used for bonding with the second flexible circuit board and are partially disposed on an upper surface of the color film substrate; the flexible display panel further comprises a display area and a non-display area located on periphery of the display area, the plurality of the first bonding pins are extended to the non-display area by passing through the display area, the plurality of the second bonding pins and the plurality of the third bonding pins are both disposed on the non-display area.

2. The flexible display device as claimed in claim 1, wherein part of the first bonding pins located on the display area are electrically connected to a signal line disposed on the display area.

3. The flexible display device as claimed in claim 1, wherein the non-display area comprises a non-bending region and a bending region, the second bonding pins and the third bonding pins are both disposed in the bending region.

4. The flexible display device as claimed in claim 1, wherein relative positions of part of the second bonding pins located on the bottom surface of the TFT array substrate and part of the third bonding pins located on the upper surface of the color film substrate are disposed in stagger.

5. The flexible display device as claimed in claim 4, wherein a pad pitch between part of the second bonding pins located on the bottom surface of the TFT array substrate is half of a corresponding bonding pitch, and a pad pitch between part of the third bonding pins located on the upper surface of the color film substrate is half of a corresponding bonding pitch.

6. The flexible display device as claimed in claim 4, wherein a pad pitch of the plurality of the second bonding pins and the plurality of the third bonding pins is greater than or equal to 27 μm.

7. The flexible display device as claimed in claim 1, wherein the first lateral surface of the TFT array substrate and the first lateral surface of the color film substrate are edged mirror planes, and a roughness of the mirror planes ranges from 0.04 μm to 0.7 μm.

8. The flexible display device as claimed in claim 1, wherein an included angle between the first lateral surface of the TFT array substrate and the bottom surface of the TFT array substrate is a fillet or a 45 degree edge chamfer, and an included angle between the first lateral surface of the color film substrate and the upper surface of the color film substrate is a fillet or a 45 degree edge chamfer.

9. The flexible display device as claimed in claim 1, wherein the driving chip is electrically connected to the first flexible circuit board and the second flexible circuit board by an anisotropic conductive film.

10. A flexible display device, comprising a backlight module, a flexible display panel, a plurality of first bonding pins, a plurality of second bonding pins, a plurality of third bonding pins, a first flexible circuit board, a second flexible circuit board, and a driving chip, and the flexible display panel further comprises a thin film transistor (TFT) array substrate, and a color film substrate corresponds to the TFT array substrate;

wherein the plurality of the first bonding pins are disposed on an interlayer between the TFT array substrate and the color film substrate, and the plurality of the first bonding pins respectively extend to a first lateral surface of the TFT array substrate and a first lateral surface of the color film substrate along a first direction, the plurality of the second bonding pins are used for bonding with the first flexible circuit board and are partially disposed on a bottom surface of the TFT array substrate, the plurality of the third bonding pins are used for bonding with the second flexible circuit board and are partially disposed on an upper surface of the color film substrate.

11. The flexible display device as claimed in claim 10, wherein relative positions of part of the second bonding pins located on the bottom surface of the TFT array substrate and part of the third bonding pins located on the upper surface of the color film substrate are disposed in stagger.

12. The flexible display device as claimed in claim 11, wherein a pad pitch between part of the second bonding pins located on the bottom surface of the TFT array substrate is half of a corresponding bonding pitch, and a pad pitch between part of the third bonding pins located on the upper surface of the color film substrate is half of a corresponding bonding pitch.

13. The flexible display device as claimed in claim 11, wherein a pad pitch between the plurality of the second bonding pins and the plurality of the third bonding pins is greater than or equal to 27 μm.

14. The flexible display device as claimed in claim 10, wherein the first lateral surface of the TFT array substrate and the first lateral surface of the color film substrate are edged mirror planes, and a roughness of the mirror planes ranges from 0.04 μm to 0.7 μm.

15. The flexible display device as claimed in claim 10, wherein an included angle between the first lateral surface of the TFT array substrate and the bottom surface of the TFT array substrate is a fillet or a 45 degree edge chamfer, and an included angle between the first lateral surface of the color film substrate and the upper surface of the color film substrate is a fillet or a 45 degree edge chamfer.

16. The flexible display device as claimed in claim 10, wherein the driving chip is electrically connected to the first flexible circuit board and the second flexible circuit board by an anisotropic conductive film.

* * * * *